US008117867B2

(12) United States Patent
Yamaguchi et al.

(10) Patent No.: US 8,117,867 B2
(45) Date of Patent: Feb. 21, 2012

(54) PROCESS FOR PRODUCING SPHERICAL INORGANIC PARTICLE

(75) Inventors: Shigeo Yamaguchi, Tokyo (JP); Takeo Inoue, Fukushima (JP)

(73) Assignee: Nitto Boseki Co., Ltd., Fukushima-Shi (JP)

( * ) Notice: Subject to any disclaimer, the term of this patent is extended or adjusted under 35 U.S.C. 154(b) by 377 days.

(21) Appl. No.: 11/990,485

(22) PCT Filed: Aug. 9, 2006

(86) PCT No.: PCT/JP2006/315750
§ 371 (c)(1),
(2), (4) Date: Feb. 15, 2008

(87) PCT Pub. No.: WO2007/020855
PCT Pub. Date: Feb. 22, 2007

(65) Prior Publication Data
US 2009/0249833 A1    Oct. 8, 2009

(30) Foreign Application Priority Data

Aug. 17, 2005  (JP) ................................ 2005-236450
Feb. 3, 2006   (JP) ................................ 2006-027240
Feb. 3, 2006   (JP) ................................ 2006-027241

(51) Int. Cl.
C03B 19/10    (2006.01)
C03B 9/00     (2006.01)
C03B 37/00    (2006.01)

(52) U.S. Cl. ....................................................... 65/21.3
(58) Field of Classification Search .................. 65/21.3; 501/33, 53–55
See application file for complete search history.

(56) References Cited

U.S. PATENT DOCUMENTS 3,133,821 A * 5/1964 Alford ............................. 501/85
(Continued)

FOREIGN PATENT DOCUMENTS

DE    143 898    9/1980
(Continued)

OTHER PUBLICATIONS

Supplementary European Search Report dated Jul. 31, 2009.
(Continued)

*Primary Examiner* — Matthew Daniels
*Assistant Examiner* — Jodi C Franklin
(74) *Attorney, Agent, or Firm* — Kratz, Quintos & Hanson, LLP

(57) ABSTRACT

A process for producing spherical inorganic particles which have high flowability, can be incorporated in a high proportion, and are useful as a filler for composite substrates such as printed wiring boards and encapsulating materials. Also provided is a process for producing spherical inorganic particles which have high flowability and can be incorporated in a high proportion and which are useful as a filler for encapsulating materials and give an encapsulating material having high electrical insulating properties. One of the processes for producing spherical inorganic particles comprises: (a1) pulverizing a silicate-containing inorganic material to form a pulverization product; (b1) heating the pulverization product in an atomized state to form the pulverization product into spherical particles; (c1) spraying water over the spherical particles to cool them while maintaining the atomized state of the spherical particles; and (d1) collecting the spherical particles. The other process, which is for producing spherical glass particles, comprises: a pulverization step in which a silicate-containing vitreous material is pulverized to form a pulverization product; an acid treatment step in which the pulverization product is contacted with an acid; and a sphering step in which the pulverization product is heated in a suspended state and formed into spherical particles.

11 Claims, 3 Drawing Sheets

U.S. PATENT DOCUMENTS

| | | | |
|---|---|---|---|
| 4,059,423 A * | 11/1977 | De Vos et al. .................. | 65/21.2 |
| 4,904,293 A | 2/1990 | Garnier et al. ................. | 65/21.4 |
| 4,923,520 A * | 5/1990 | Anzai et al. .................... | 106/490 |
| 4,961,770 A * | 10/1990 | Johnson et al. ................ | 65/21.3 |
| 6,254,981 B1 * | 7/2001 | Castle ........................... | 428/325 |
| 2002/0024161 A1 | 2/2002 | Konya et al. | |
| 2004/0091712 A1 * | 5/2004 | Marohn ........................ | 428/417 |
| 2005/0132752 A1 | 6/2005 | Yamagata et al. | |
| 2007/0196597 A1 * | 8/2007 | Shiratsuchi et al. ....... | 428/32.34 |
| 2009/0176920 A1 * | 7/2009 | Sandmeyer et al. .......... | 524/413 |

FOREIGN PATENT DOCUMENTS

| | | |
|---|---|---|
| GB | 2176774 A | 1/1987 |
| JP | 54-29318 | 3/1979 |
| JP | 63-260832 | 10/1988 |
| JP | 1-55201 | 11/1989 |
| JP | 4-338133 | 11/1992 |
| JP | 6-183759 | 7/1994 |
| JP | 7-17706 | 1/1995 |
| JP | 7-61855 | 7/1995 |
| JP | 7-61856 | 7/1995 |
| JP | 7-172876 | 7/1995 |
| JP | 8-91874 | 4/1996 |
| JP | 8-310836 | 11/1996 |
| JP | 11-21147 | 1/1999 |
| JP | 11-43321 | 2/1999 |
| JP | 11-228164 | 8/1999 |
| JP | 2001-73253 | 3/2001 |
| JP | 2001-261328 | 9/2001 |
| JP | 2002-68728 | 3/2002 |
| JP | 2003-192387 | 7/2003 |
| JP | 2004-338961 | 12/2004 |
| JP | 2005-29425 | 2/2005 |
| JP | 2005-179145 | 7/2005 |

OTHER PUBLICATIONS

Shirong Chen, et al., "Application of Silane Coupling Agent", *Silicone Material*, vol. 17, No. 5, 2003, pp. 28-31.

Editor Committee et al., Dictionary of Chemical Technology (I), *Chemical Industry Pres*, 2003, p. 875.

Chinese Office Action dated Apr. 30, 2010, w/ English Translation.

Japanese Office Action mailed Nov. 18, 2011, in counterpart Japanese Application No. 2005-236450.

\* cited by examiner (a)

(b)

(a)

(b)

PROCESS FOR PRODUCING SPHERICAL INORGANIC PARTICLE

TECHNICAL FIELD

The present invention relates to a process for producing spherical inorganic particles.

BACKGROUND ART

Inorganic particles, e.g., those containing silicate, have been used as fillers for composite materials, e.g., printed wiring boards and encapsulating materials, to improve their dimensional accuracy, heat resistance and so forth. Crushed glass fibers are sometimes used as inorganic particles because they have uniform compositions and can be easily treated to reduce proportions of coarse particles. However, crushed glass fibers tend to be columnar often with high length/diameter ratios, and hence to have increased viscosity, when contained as fillers in resins in a high proportion, at resin melting point to greatly deteriorate resin flowability. Hence, they have limited applications as fillers to be contained in high proportions. Moreover, their dispersibility in resins is far from sufficient.

For production of inorganic particles with uniform size distributions, Patent Document 1, for example, discloses a process for producing glass powder containing particles of excessively high or low aspect ratios to limited extents by pressing crushed glass fibers in a container. This technique, however, is difficult to give spherical particles, because they are broken under a mechanical pressure where they lie over one another. Hence, they are far from sufficient as fillers which can keep resins well fluid when they are incorporated therein in high proportions.

Patent Document 2 discloses a process for producing fine glass particles of sharp size distribution by crushing glass fibers after they are coated with tetraalkoxy silane. This technique is also difficult to give spherical particles, as is the case with the technique disclosed by Patent Document 1, and are far from sufficient as fillers which can keep resins well fluid when they are incorporated therein in high proportions.

For production of spherical metal oxide particles, Patent Document 3 discloses a process in which metal powder, e.g., that of metallic silicon, as a starting material is thrown into a chemical flame to form metal particles in an atomized state, which are exploded to synthesize the ultrafine oxide particles, e.g., silicon dioxide particles. This process, however, involves danger and high cost.

For production of spherical particles from glass fibers, Patent Document 4, for example, discloses a process for treating fibrous glass as a starting material, in which glass fibers coated with an organic material, e.g., binder, is thrown into a flame, after being crushed, to spheroidize the vitreous substance while burning up the organic coating material. This process, however, is difficult to completely burn up the organic substance, and tends to allow the spherical particles produced to reagglomerate with each other and turn into composite particles, because cooling is not adopted positively.

This technique, however, is originally developed to produce raw glass powder for recycling, in which spent fibrous glass coated with an organic substance is recycled to be reused as industrial raw materials. The glass powder produced by this process ultimately needs treatment of the organics or the like to produce industrial products.

For production of spherical glass particles, Patent Document 5 discloses a process in which molten glass as a raw material is ejected from a nozzle into a continuous flow moving downwards to turn into glass droplets, which are deorbited from a downward path to be recovered in a recovery tank.

For production of spherical glass particles, Patent Document 6 discloses a process in which a raw glass material is thrown into an oxygen-containing plasma to be molten and spheroidized.

For production of spherical glass particles, Patent Document 7 discloses a process in which a solution or sol containing a varying mixture as a raw material for glass, whose composition is adjusted to have a very specific final glass composition, e.g., that containing $SiO_2$ at 2 to 15% by mass, is ejected into a flame and the resulting fine droplets are quenched. The product of this process can have specific purposes, e.g., production of inter-layer insulation films for fluorescent displays for photolithography and thin glass films as substrates.

Patent Document 8 discloses a process for production of spherical glass particles, substantially similar to that disclosed by Patent Document 7, except that the final glass composition is controlled to contain $SiO_2$ at 40 to 70% by mass, to improve flowability of a resin in which they are incorporated. The spherical glass particles as the final product can have specific purposes, e.g., production of thin glass films as substrates, as is the case with that produced by the Patent Document 7 process.

On the other hand, Patent Document 9 discloses a composition for high-strength glass fibers containing $SiO_2$, $Al_2O_3$ and MgO at specific contents and substantially free of an alkali metal, which are produced in a short melting time and contain substantially no hollow fibers.

For treatment of glass fibers with an acid, Patent Document 10 discloses a process for treating E-glass fibers with an aqueous acidic solution to form a surface layer containing silica at a high content and thereby to improve heat resistance of the fibers without sacrificing the E-glass fiber characteristics.

Also for treatment of glass fibers with an acid, Patent Document 11 discloses a process for producing glass cloth of a specific E-glass composition, in which glass cloth of E-glass composition is immersed in an aqueous acetic acid solution to elute an alkaline-earth and alkali metals into the solution and thereby decrease their content to 20 ppm or less based on the glass cloth.

For treatment of silicon dioxide particles with an acid, Patent Document 12 discloses a process in which metallic silicon particles are burnt in an oxygen-containing flow to form the silicon dioxide particles having an average diameter of 0.01 to 10 μm, and the resulting particles are washed with a low-concentration aqueous mineral acid solution, e.g., nitric acid, to remove radioactive element compounds, e.g., uranium compounds.

For treatment of metallic silicon particles, Patent Document 13 discloses a process in which metallic silicon particles are washed with an aqueous mineral acid to remove radioactive elements, e.g., uranium and thorium, to 1 ppb or less, and the treated particles are burnt in an oxygen-containing flow to produce high-purity silicon dioxide particles having an average diameter of 0.01 to 10 μm.

Patent Document 1: JP-A-4-338133
Patent Document 2: JP-A-2003-192387
Patent Document 3: JP-B-1-55201
Patent Document 4: JP-A-11-228164
Patent Document 5: JP-A-2005-179145
Patent Document 6: JP-A-2004-338961
Patent Document 7: JP-A-8-310836

Patent Document 8: JP-A-8-91874
Patent Document 9: JP-A-11-21147
Patent Document 10: JP-A-7-172876
Patent Document 11: JP-A-2001-73253
Patent Document 12: JP-B-7-61855
Patent Document 13: JP-B-7-61856

DISCLOSURE OF THE INVENTION

Problems to be Solved by the Invention

Inorganic particles as a filler for composite materials, e.g., printed wiring boards and encapsulating materials, are silane-treated with an organosilane compound in many cases to improve product characteristics.

Methods for silane treatment with an organosilane compound include (1) crushing glass fibers as a raw material for fillers after they are immersed in an aqueous solution containing an organosilane compound; (2) immersing glass fibers as a raw material for fillers after they are crushed into the finer particles; and (3) kneading glass fibers as a raw material for fillers with an organosilane compound and raw material resin, after they are crushed into the finer particles.

The method (1) involves problems resulting from insufficient treatment, because crushed glass fibers are not totally treated with an organosilane compound, leaving the crushed planes left untreated. The method (2) tends to cause agglomeration of silane-treated glass particles while they are being dried into composite particles. The method (3) tends to deteriorate silane addition efficiency, because of insufficient coupling reaction by an organosilane compound, resulting in the insufficient chemical bonds formed.

Glass particles having a composition commonly referred to as alkali-free glass involve limited problems, when used for fillers for printed wiring board laminates. However, they contain trace quantities of an alkali metal and are inferior to silica particles free of an alkali metal in electrical insulation capability, when to be used for an encapsulating material together with a resin. Hence, it is desirable to improve their characteristics for use for encapsulating materials.

Moreover, alkali-free glass has a lower melting point than silicon dioxide, and the spheroidized particles have substantially truly circular cross-sections. When they are from crushed glass fibers, they are easier to control particle diameter and better dispersed in a resin to make the mixture more fluid, and hence expected to give compacts incorporated with the particles as a filler in a higher proportion.

The first aspect of the present invention, which solves the above problems involved in the conventional techniques, provides a process for producing spherical inorganic particles more suitable for fillers.

Each of the second to fourth aspects of the present invention, which also solves the above problems involved in the conventional techniques, provides a process for producing spherical inorganic particles more suitable for fillers for encapsulating materials in which they are incorporated together with a resin by improving their electrical insulating properties while retaining the spherical alkali-free glass particle characteristics that allow them to be incorporated in a high proportion.

Means for Solving the Problems

The first aspect of the present invention, which solves the above problems, provides a process for producing spherical inorganic particles, comprising the following steps:

(a1) pulverizing an inorganic material containing silicate to form a pulverization product;
(b1) heating the pulverization product in a floated state to turn the pulverization product into spherical particles;
(c1) spraying water onto the spherical particles to cool the spherical particles while maintaining the atomized state of the spherical particles; and
(d1) collecting the cooled spherical particles.

The silicate-containing inorganic material to be pulverized in the step (a1) is preferably vitreous, in particular in the form of fibers, and not covered with a coating agent.

Water to be used in the step (c1) preferably contains an organosilane compound.

The second aspect of the present invention, which solves the above problems, provides a process for producing spherical glass particles, comprising the following steps:

(a2) pulverizing a vitreous material containing silicate and containing an alkali metal oxide at 1.0% by mass or less to form a pulverization product;
(b2) heating the pulverization product in a floated state to turn the pulverization produce into spherical particles; and
(d2) contacting the spherical particles with an acid to form spherical particles surface-treated with the acid.

It is preferable to include a step (c2), between the steps (b2) and (d2), of spraying water onto the spherical particles to cool the spherical particles while maintaining the floated state of the spherical particles.

The silicate-containing vitreous material is preferably in the form of glass fibers.

Each of the third and fourth aspects of the present invention, which solves the above problems, provides a process for producing spherical glass particles, comprising the following steps:

(a3) contacting a silicate-containing vitreous material containing an alkali metal oxide at 1.0% by mass or less with an acid to form silicate-containing vitreous material surface-treated with the acid,
(b3) pulverizing the surface-treated silicate-containing vitreous material to form a pulverization product; and
(c3) heating the pulverization product in a floated state to turn the pulverization product into the spherical particles.

The fourth aspect of the present invention provides a process for producing spherical glass particles, comprising the following steps:

(a4) pulverizing a silicate-containing vitreous material containing an alkali metal oxide at 1.0% by mass or less to form a pulverization product;
(b4) contacting the pulverization product with an acid to form pulverization product surface-treated with the acid, and
(c4) heating the surface-treated pulverization product in a floated state to turn the surface-treated pulverization product into spherical particles.

The silicate-containing vitreous material for the third and fourth aspects is preferably in the form of glass fibers.

Moreover, each of the third and fourth aspects preferably includes, after each of the steps (c3) and (c4), each of the steps (d3) and (d4); spraying water containing an organosilane compound onto the spherical particles to cool the spherical particles while maintaining the floated state of the spherical particles.

EFFECTS OF THE INVENTION

First Aspect

The inorganic particles produced by the first aspect of the present invention are substantially spherical, and hence have high flowability as a filler for resins and can be incorporated therein uniformly and in a high proportion. The heated spherical particles are cooled with water sprayed onto them while being kept in an atomized state, dispensing with an additional cooling zone in the production system. Moreover, the spherical particles are cooled while being kept in an atomized state (floated state) to prevent them from agglomeration with each other into composite particles. Still more, the particles are cooled with sprayed water kept at high temperature, and are already dried while the cooled spherical particles are recovered, thus dispensing with an additional drying step.

The silicate-containing organic material as a raw material is preferably vitreous, because the product spherical inorganic particles have a cross-section of high sphericity. Use of the glass fibers can give spherical inorganic particles of relatively uniform particle diameter. In other words, the fibers can be sufficiently pulverized to give the spherical particles in consideration of size variation only in the length direction, because they have substantially a uniform diameter. Another advantage coming from use of glass fibers is a relatively low content of volatile components in the product spherical inorganic particles, because the fibers are spheroidized after they are molten.

Moreover, the silicate-containing inorganic material used as a raw material for the process of the first aspect of the present invention is preferably not covered by a coating agent, e.g., organic agent, protective agent, sizing agent or the like. A desired pulverization product tends to be formed in a shorter time when it is uncoated. For example, an uncoated raw material can be sufficiently pulverized in about 1 hour into the particles of substantially uniform size. This compares with about 5 hours needed for the coated one to have the given pulverization product of almost the same size.

The spherical particles formed by pulverizing a silicate-containing inorganic material can be totally coated with an organocompound, when sprayed preferably with water containing the compound. This eliminates a disadvantage of insufficient coating with an organosilane compound, when a raw material is sprayed with water containing the compound before being pulverized. Moreover, the spherical particles are preferably cooled with sprayed water containing an organosilane compound while being kept in an atomized state, because this can prevent them from agglomeration with each other into composite particles. In other words, merely immersing the silicate-containing inorganic material in water containing an organosilane compound without using sprayed water may cause their agglomeration into composite particles even when they are subsequently dehydrated and dried, causing a disadvantage that they should be repulverized to secure a given particle diameter.

Second Aspect

A silicate-containing vitreous material as a raw material for the process of the second aspect of the present invention has a relatively low melting point. Hence, the spherical glass particles produced by the process of the second aspect have a substantially circular cross-section, and have high flowability and can be possibly incorporated as a filler in a high proportion in a resin. Moreover, the silicate-containing vitreous material as a raw material contains an alkali metal oxide at 1.0% by mass or less, and the spherical particles as the pulverization product, which is treated with an acid to elute the metallic ions, e.g., alkaline and alkaline-earth metal ions, out of the vitreous material, can greatly improve electrical insulating properties of an encapsulating material in which they are incorporated together with a resin.

The process brings another advantage of relatively low content of volatile components in the spherical glass particles, because the vitreous material is spheroidized after they are produced by melting the silicate-containing inorganic material.

In the process of the second aspect of the present invention, the spherical particles can be efficiently cooled with water, when it is sprayed onto them while the particles are kept in a floated state.

Moreover, the process can reduce a proportion of the coarse spherical particles when the particles are produced from the glass fibers, which have substantially the same diameter, because they tend to be pulverized in the cross-sectional direction.

Third and Fourth Aspects of the Invention

A silicate-containing vitreous material as a raw material for the process of the third and fourth aspects of the present invention has a relatively low melting point. Hence, the spherical glass particles produced by these processes have a substantially circular cross-section, and have high flowability and can be possibly incorporated as a filler in a high proportion in a resin. Moreover, the silicate-containing vitreous material as a raw material contains an alkali metal oxide at 1.0% by mass or less, and the spherical particles as the pulverization product, which is treated with an acid to elute the metallic ions, e.g., alkaline and alkaline-earth metal ions, out of the vitreous material, can greatly improve electrical insulating properties of an encapsulating material in which they are incorporated together with a resin.

Still more, these processes bring another advantage of relatively low content of volatile components in the spherical glass particles, because the vitreous material is spheroidized after they are produced by melting the silicate-containing inorganic material.

Still more, these processes can reduce a proportion of the coarse spherical particles when the particles are produced from the glass fibers, which have substantially the same diameter, because they tend to be pulverized in the cross-sectional direction.

Still more, the spherical particles formed under heating, when cooled with sprayed water containing an organosilane compound while being kept in a floated state, can be simultaneously cooled and treated with the silane compound while preventing agglomeration of the particles into the composite particles. The particles, when sprayed with water containing an organosilane compound at high temperature, are already dried while the cooled spherical particles are recovered, which dispenses with an additional drying step.

BEST MODE FOR CARRYING OUT THE INVENTION

First Aspect of the Invention

A silicate-containing inorganic material as a raw material for the process of the first aspect of the preset invention is preferably vitreous, more preferably alkali-free glass, still more preferably alkali-free glass containing silicon dioxide at 50% by mass or more.

The vitreous material is preferably in the form of fibers about 3 to 30 μm in diameter, viewed from their easiness of pulverization.

Moreover, when the silicate-containing inorganic material covered with a coating agent is used as a raw material for the process of the present invention, it is preferably pulverized after being treated by calcination or the like to remove the coating agent.

The pulverization step (a1) may be carried out by a known technique, e.g., ball-milling. For example, the pulverization product particles have an average particle diameter of 20 μm or so, although not limited thereto. The finer particles having a diameter of 1 μm or less may be formed.

The pulverization product produced by the step (a1) may be treated by a system illustrated in FIG. 1 for the subsequent steps of (b1) to (d1). These steps are described by referring to FIG. 1.

The pulverization product 1 formed by the step (a1) (pulverization step) is treated in the step (b1) (spheroidization step), in which the product particles are kept in an atomized (floated) state by, for example, throwing the product 1, stored in a storage tank 2, into a melting zone 9 in a furnace 8 from the top by a powder supply unit 3, e.g., table feeder, screw feeder, supersonic sprayer or the like, while being carried by a carrier gas 6.

The carrier gas 6 may be nitrogen, air or oxygen, or preferably a gas for combustion 4 described later viewed from working efficiency. When danger of explosion is anticipated, nitrogen is preferably used.

In the step (b1) (spheroidization step), the pulverization product is heated by a flame from a burner 7, produced by combusting a fuel gas 5 with the combustion gas 4, air or oxygen. The fuel gas 5 is preferably an LPG gas (propane gas).

In the melting zone 9 in the furnace, the particles can be heated to about 1500 to 2000° C. by an air burner with air as the combustion gas 4, or to about 2400 to 3000° C. by an oxygen burner with oxygen. A water-cooled cooling zone (not shown) may be disposed around the lower portion of the furnace 8, as required, when the fuel gas 5 is combusted with oxygen, for preliminary cooling for the subsequent step (c1) (cooling step).

The heating turns the pulverization product 1 into the spherical particles.

The particles formed under heating in the melting zone 9 in the furnace are cooled in the step (c1), while they are falling, with water, e.g., cooling spray 10 injected from a spraying port disposed in the lower portion of the furnace. This step cools the spherical particles to a lower temperature, e.g., about 160° C., while they are collected in the subsequent step (d1). They can be also dehydrated.

In the step (c1), the sprayed water preferably contains an organosilane compound at 0.01 to 3.0% by mass. How it is contained is not limited. For example, it may be dissolved in water, and the resulting solution is sprayed. Species of organosilane compound to be dissolved is not limited. Some of the examples include those having a hydrolyzable group and hydrophobic group (organic group), e.g., known silane coupling agents for glass fibers.

These silane coupling agents include silane compounds represented by the following formula:

$$R_{4-n}-Si-(OR')_n$$

wherein, R is an organic group; R' is methyl, ethyl or propyl group; "n" is an integer of 1 to 3; R's may be the same or different; and "n" is preferably 3.

The silane compounds include those having an unsaturated double bond, e.g., vinyl triethyxy silane, vinyl trimethyxy silane and γ-(methacryloyloxypropyl)trimethoxy silane; those having an epoxy group, e.g., β-(3,4-epoxycyclohexyl) ethyl trimethoxy silane, γ-glycidyloxypropyl trimethoxy silane and γ-glycidyloxypropylmethyl diethoxy silane; those having a mercapto group, e.g., γ-mercaptopropyl trimethoxy silane; and those having an amino group, e.g., γ-aminopropyl triethoxy silane, N-β(aminoethyl)γ-aminopropyl trimethoxy silane and N-β(N-vinylbenzylaminoethyl)-γ-aminopropyl trimethoxy silane.

In the step (d1), the spherical particles cooled with sprayed water in the step (c1) may be collected by a powder recovery unit. When a powder recovery unit is employed, the cooled spherical particles are collected by a cyclone, bag filter, wet collector or the like, wherein a suction fan, blower or the like is used, as required, to discharge gases outdoors. The powder recovery unit is preferably a combination of cyclone and bag filter.

Second to Fourth Aspects of the Present Invention

A silicate-containing vitreous material as a raw material for the process of the present invention is more preferably the one commonly referred to as alkali-free E glass having a composition containing an alkali metal, e.g., sodium or potassium, at 0.8% by mass or less. It is still more preferably the one commonly referred to as S glass having a composition containing an alkali metal at a still lower content of 0.1% by mass or less. It still more preferably contains silicon dioxide at 50 to 70% by mass. A glass composition containing silicon dioxide at a content beyond the above range may be difficult to give a vitreous material (fibrous glass, in particular) or to pulverize into spherical particles of substantially circular cross-section.

The representative E and S glass compositions for the present invention have constituent component and properties given in Table 1.

TABLE 1

| | | E glass | | S glass | |
|---|---|---|---|---|---|
| | | Specified values | Observed values | Specified values | Observed values |
| SiO$_2$ | | 52-56 | 55.1 | 64-66 | 64.3 |
| B$_2$O$_3$ | | 5-10 | 6.3 | | 0 |
| Al$_2$O$_3$ | | 12-16 | 14.1 | 24-26 | 25.2 |
| CaO | | 20-25 | 22.4 | | 0.02 |
| MgO | | | 1.4 | 9-11 | 10.3 |
| R$_2$O | Na$_2$O | 0-0.8 | 0.4 | up to 0.1 | 0.07 |
| | K$_2$O | | 0.2 | | 0.01 |
| Properties | | Electrically insulation, for common products | | High-strength, high-modulus products | |

Unit of the specified and observed values is % by mass. Observed values of CaO in the S glass composition, B$_2$O$_3$, and R$_2$O are determined by a wet analysis procedure. Observed values of other compounds are determined by fluorescent X-ray analysis.

The vitreous material is preferably in the form of fibers about 3 to 30 μm in diameter, viewed from their easiness of pulverization.

Moreover, a silicate-containing vitreous material used as a raw material for the process of the present invention is preferably not covered by a coating agent, e.g., organic surface coating agent, protective agent, sizing agent or the like. A desired pulverization product tends to be formed in a shorter time when it is uncoated. For example, an uncoated raw material can be sufficiently pulverized in about 1 hour into the particles of substantially uniform size. This compares with about 5 hours needed for the coated one. When a silicate-containing vitreous material covered with a coating agent is used as a raw material, it is preferably pulverized after being treated by calcination or the like to remove the coating agent.

A silicate-containing vitreous material may be pulverized for the present invention by a known technique, e.g., ball-milling. The pulverization product particles have an average particle diameter of 20 μm or so, although not limited thereto. The finer particles having a diameter of 1 μm or less may be formed.

Second Aspect of the Present Invention

The pulverization product produced by the pulverization step in the present invention may be treated by a system illustrated in FIG. 1 for the subsequent step of spheroidization and then the step (c2) (cooling step), as required, in which it is cooled with sprayed water. The description of this embodiment by referring to FIG. 1 is the same as that for the first aspect of the present invention, described earlier, where an acid treatment step is not shown.

The spheroidization step carried out under heating is followed by a cooling step in which the resulting spherical particles are cooled with sprayed water while they are kept in a fluidized state. More specifically, the pulverization product treated under heating into the spherical particles in the melting zone 9 are cooled, while they are falling, with cooling spray 10 injected from a spraying port disposed in the lower portion of the furnace. This step cools the spherical particles to a lower temperature, e.g., about 150° C., while they are collected in the subsequent step (d1). They can be also sufficiently dehydrated.

The spherical particles cooled with sprayed water may be collected by the same collector, means and procedure as those used in the first aspect of the invention.

In the process of the second aspect of the present invention, the cooled spherical particles are brought into contact with an acid, preferably by being immersed in the acid, to produce the surface-treated spherical glass particles. The useful acids are not limited, and include organic acids, e.g., acetic acid, and inorganic acids, e.g., nitric, hydrochloric and sulfuric acids, of which a strong acid is more preferable. Hydrochloric acid and sulfuric acid, when used, may leave respective Cl and S in the spherical glass particles. These elements are inadequate, when remain in an encapsulating material, and nitric acid, which leaves no residue inadequate for an encapsulating material, is more preferable. Acid concentration of a solution in which the spherical particles are to be immersed, and immersion temperature and time may be adequately set. Concentration of nitric acid, when it is used, is preferably 0.3 to 2.0 N. The acid treatment elutes an alkali metal, and alkaline-earth metal in some cases, present on the silicate-containing inorganic material surfaces. Moreover, it is preferable that the acid-treated particles are dehydrated and washed with water to remove the eluted metallic ions.

In this specification, the contacting of the spherical particles with an acid is hereinafter referred to as merely "acid treatment."

It is preferable that the acid-treated spherical glass particles produced by the process of the present invention are further treated with an organosilane compound (silane treatment). Species of organosilane compound to be dissolved is not limited. Some of the examples include those having a hydrolyzable group and hydrophobic group (organic group), e.g., known silane coupling agents for glass fibers.

The second aspect may use the same silane coupling agent as that for the first aspect.

Third and Fourth Aspects

In the processes of the third and fourth aspects of the present invention, the cooled spherical particles are brought into contact with an acid, preferably by being immersed in the acid. The useful acids are not limited, and include organic acids, e.g., acetic acid, and inorganic acids, e.g., nitric, hydrochloric and sulfuric acids, of which a strong acid is more preferable. Hydrochloric acid and sulfuric acid, when used, may leave respective Cl and S in the spherical glass particles. These elements are inadequate, when remain in an encapsulating material, and nitric acid, which leaves no residue inadequate for an encapsulating material, is more preferable. Acid concentration of a solution in which the spherical particles are to be immersed, and immersion temperature and time may be adequately set. Concentration of nitric acid, when it is used, is preferably 0.3 to 2.0 N. The acid treatment elutes an alkali metal, and alkaline-earth metal in some cases, present on the silicate-containing inorganic material surfaces. Moreover, it is preferable that the acid-treated particles are dehydrated and washed with water to remove the eluted metallic ions.

In this specification, the contacting of the spherical particles with an acid is hereinafter referred to as merely "acid treatment."

The third aspect of the present invention pulverizes a silicate-containing inorganic material after it is treated with an acid. This brings an advantage of improved pulverization efficiency, because it becomes fragile by the acid treatment and is more amenable to pulverization.

The fourth aspect of the present invention treats a silicate-containing vitreous material with an acid after it is pulverized. This brings an advantage of improved acid treatment efficiency, because of its increased specific surface area by the pulverization.

The present invention can have still improved pulverization and acid treatment efficiencies, when a silicate-containing vitreous material is in the form of glass fibers.

The pulverization product produced by the pulverization step in the present invention may be treated by a system illustrated in FIG. 1 for the subsequent step of spheroidization and then the steps (d3) and (d4), as required, in which the spherical particles in a floated state are treated with a sprayed aqueous solution of organosilane compound (which is hereinafter sometimes referred to merely as "silane treatment" or "silane treatment step). The description of this embodiment by referring to FIG. 1 is the same as that for the first aspect of the present invention, described earlier, where an acid treatment step is not shown.

The silane treatment in the steps (d3) and (d4), although not essential for the present invention, can be carried out with a sprayed aqueous solution for cooling subsequent to the spheroidization step. The spherical particles may be brought into contact, while they are falling, with water containing an organosilane compound (cooling spray 10) sprayed from a spraying port disposed in the lower portion of the furnace. This cools the spherical particles to a lower temperature, e.g., about 150° C., while they are collected in the subsequent step, and dehydrates them.

In the steps (d3) and (d4), the sprayed aqueous solution preferably contains an organosilane compound at 0.01 to 3.0% by mass. How it is contained is not limited. For example, it may be dissolved in water, and the resulting aqueous solution is sprayed. Species of organosilane compound to be dissolved is not limited. Some of the examples include those having a hydrolyzable group and hydrophobic group (organic group), e.g., known silane coupling agents for glass fibers.

These steps may use the same silane coupling agent as that for the first and second aspects of the present invention.

The spherical glass particles produced by the process of the present invention may be collected by the subsequent step. For example, the spherical particles cooled with sprayed water in the silane treatment step may be collected by the same collector, means and procedure as those used in the first and second aspects of the invention.

When the raw material is pulverized in one of the first to fourth aspects of the present invention, in particular to a weight-average particle diameter of several microns, the particles may clog the piping systems. Hence, they may be incorporated with finer particles having a weight-average particle diameter of 1 μm or less before or after the pulverization step to prevent the above troubles. It is preferable to incorporate fine silicate particles having an average primary particle diameter of 5 to 100 nm at 1 to 5% by mass in the pulverization product. The fine silicate particles can be produced by treating silicon tetrachloride at high temperature for hydrolysis and then removing hydrogen chloride.

EXAMPLES

The present invention is described by Examples.

First Aspect of the Present Invention

Example 1

Fibrous E-glass having a softening point of 850° C. as a silicate-containing inorganic material, pulverized to have a filament diameter of 11 μm and average fiber length of 21 μm, was carried by air into the system illustrated in FIG. 1 at 15 kg/hour, heated by an air burner, and cooled with sprayed water containing γ-glycidyloxypropyl trimethoxy silane at 0.1% by mass, while the fibers were kept in an atomized state, and collected by a bag filter to produce the spherical E-glass particles.

Example 2

Pulverized crystalline silica (average particle diameter: 15 μm) having a softening point of 1700° C. as a silicate-containing inorganic material was carried by oxygen into the system illustrated in FIG. 1, provided with a cooling zone, at 8 kg/hour, heated by an oxygen burner, and cooled with sprayed water containing γ-glycidyloxypropyl trimethoxy silane at 0.1% by mass, while the particles were kept in an atomized state, and collected by a bag filter to produce the spherical silica particles.

FIGS. 2 and 3 show scanning electron micrograms of the respective spherical inorganic particles produced in Examples 1 and 2, where (a) shows the pulverized product and (b) the spherical inorganic particles. As shown in FIG. 2 (b), the spherical E-glass particles produced in Example 1 had a highly circular cross-section, having an average particle diameter of about 18 μm and specific surface area of about 0.4 m²/g. As shown in FIG. 3 (b), the spherical silica particles produced in Example 2 had an average particle diameter of about 25 μm and specific surface area of about 1.7 m²/g, although having a less circular cross-section than the particles produced in Example 1.

Evaluation

An epoxy resin compact incorporated with the spherical particles produced in each of Examples 1 and 2 as a filler at 85% by mass was produced. Each showed high dimensional stability and moisture resistance. Even an epoxy resin composition incorporated with each of the fillers produced in Examples 1 and 2 at 70% by mass could not be molded because viscosity of the resin increases excessively.

Second to Fourth Aspects of the Invention

Example 3

Chopped strands of fibrous E-glass having an observed composition given in Table 1, average length of 25 mm and softening point of 850° C. was used as a silicate-containing vitreous inorganic material.

They were ball-milled to an average particle diameter of 25 μm, and carried by air into the system illustrated in FIG. 1 at 15 kg/hour and heated by an air burner to produce the spherical particles.

Then, they were immersed in a 1.0 N aqueous nitric acid solution (500 cc per 20 g of the sample) at 70° C. for 1 hour for the acid treatment, and then washed with water and dehydrated.

The acid treatment was carried out (1) before the pulverization step, (2) after the pulverization step and before the spheroidization step, and (3) after the spheroidization step.

For measurement of electroconductivity, 10 g of the sample subjected to all of the pulverization, acid treatment and spheroidization steps was immersed in 100 cc of pure water with stirring and then the immersion medium was measured. It is considered that the medium of higher electroconductivity contains an eluted alkali metal at a higher content, assuming that the substance eluted out of the sample is an alkali metal, and that such a sample contains the alkali metal at a higher content. The results are given in Table 2.

TABLE 2

| | | Example 3 | Example 4 | Example 5 | Comparative Example 1 | Comparative Example 2 |
|---|---|---|---|---|---|---|
| Glass composition | | E-glass | S-glass | S-glass | E-glass | S-glass |
| Nitric acid concentration | | 1.0N | 0.5N | 1.0N | Nitric acid not used | Nitric acid not used |
| Electroconductivity, unit: μS/cm | (1) | 14.2 | 5.2 | 3.7 | 180 | 27 |
| | (2) | 11.3 | 4.3 | 2.9 | | |
| | (3) | 11.0 | 4.0 | 2.8 | | |

(1) Acid treatment followed by pulverization and then spheroidization (third aspect)
(2) Pulverization followed by acid treatment and then spheroidization (fourth aspect)
(3) Pulverization followed by spheroidizatio and then acid treatment (second aspect)

Example 4

Spherical particles were produced in the same manner as in Example 3, except that chopped strands of fibrous S-glass having an observed composition given in Table 1 were used as a silicate-containing vitreous material in place of the chopped strands of fibrous E-glass, and a 0.5 N aqueous nitric acid solution was used in place of the 1.0 N aqueous nitric acid solution. The results are given in Table 2.

Example 5

Spherical particles were produced in the same manner as in Example 3, except that chopped strands of fibrous S-glass having an observed composition given in Table 1 were used as a silicate-containing vitreous material in place of the chopped strands of fibrous E-glass. The results are given in Table 2.

Comparative Example 1

Spherical particles were produced in the same manner as in Example 3, except that the acid treatment was omitted. The results are given in Table 2.

Comparative Example 2

Spherical particles were produced in the same manner as in Example 4, except that the acid treatment was omitted. The results are given in Table 2.

Evaluation of Electroconductivity

The spherical glass particles had greatly decreased electroconductivity when treated with the acid (Examples 3 to 5), whether they were of E-glass or S-glass, based on which it is considered that an alkali metal component present in the spherical glass particles is advantageously and greatly eluted out.

Evaluation of Resin Flowability

No significant difference in flowability was observed among the resins incorporated with the spherical glass particles produced in Examples 3 to 5 and Comparative Examples 1 and 2. All of these particles were spherical and considered to affect little on resin flowability, which is greatly determined by particle shape.

Evaluation of Pulverization Easiness

The as-produced chopped strands of S-glass fibers, used in Examples 4 or 5, were pulverized before or after having been acid-treated in a manner described in Example 3, where 100 kg of the chopped strands were pulverized in a 100 L ball mill with 100 kg of balls for 3 hours. The acid-untreated and acid-treated pulverization products had a respective average particle diameter of 9.6 and 5.4 μm, based on which it is considered that the acid-treatment facilitates pulverization of the strands. It should be noted, however, that the acid-treated particles had a slightly higher electroconductivity as shown in Table 2; (1): equivalent to the acid-treated product and (2): equivalent to the acid-untreated product.

Fabrication of Compacts

The spherical particles (1) and (2) produced in Example 3 were subjected to silane treatment in which they were cooled with a sprayed aqueous solution containing aminopropyl triethoxy silane as a silane compound at 0.5% by mass. Moreover, the acid-treated spherical particles (3) produced in Example 3 were also subjected to silane treatment in which they were cooled with sprayed aqueous solution containing aminopropyl triethoxy silane as a silane compound at 0.5% by mass. An epoxy resin compacts were fabricated, each incorporated with the silane-treated spherical glass particles as a filler at 80% by mass. They were produced without causing any trouble. However, an epoxy resin incorporated with acid-treated particles produced in Example 3 had insufficient flowability at the resin melting point and could not be fabricated into a compact.

Summary

The order of the pulverization, spheroidization and acid-treatment steps should be adequately set in consideration of required product properties.

INDUSTRIAL APPLICABILITY

The spherical inorganic particles, including spherical glass particles, produced by the process of the present invention can find use as fillers for composite base materials, e.g., printed wiring boards and encapsulating materials.

DESCRIPTION OF SYMBOLS

Figure 1:
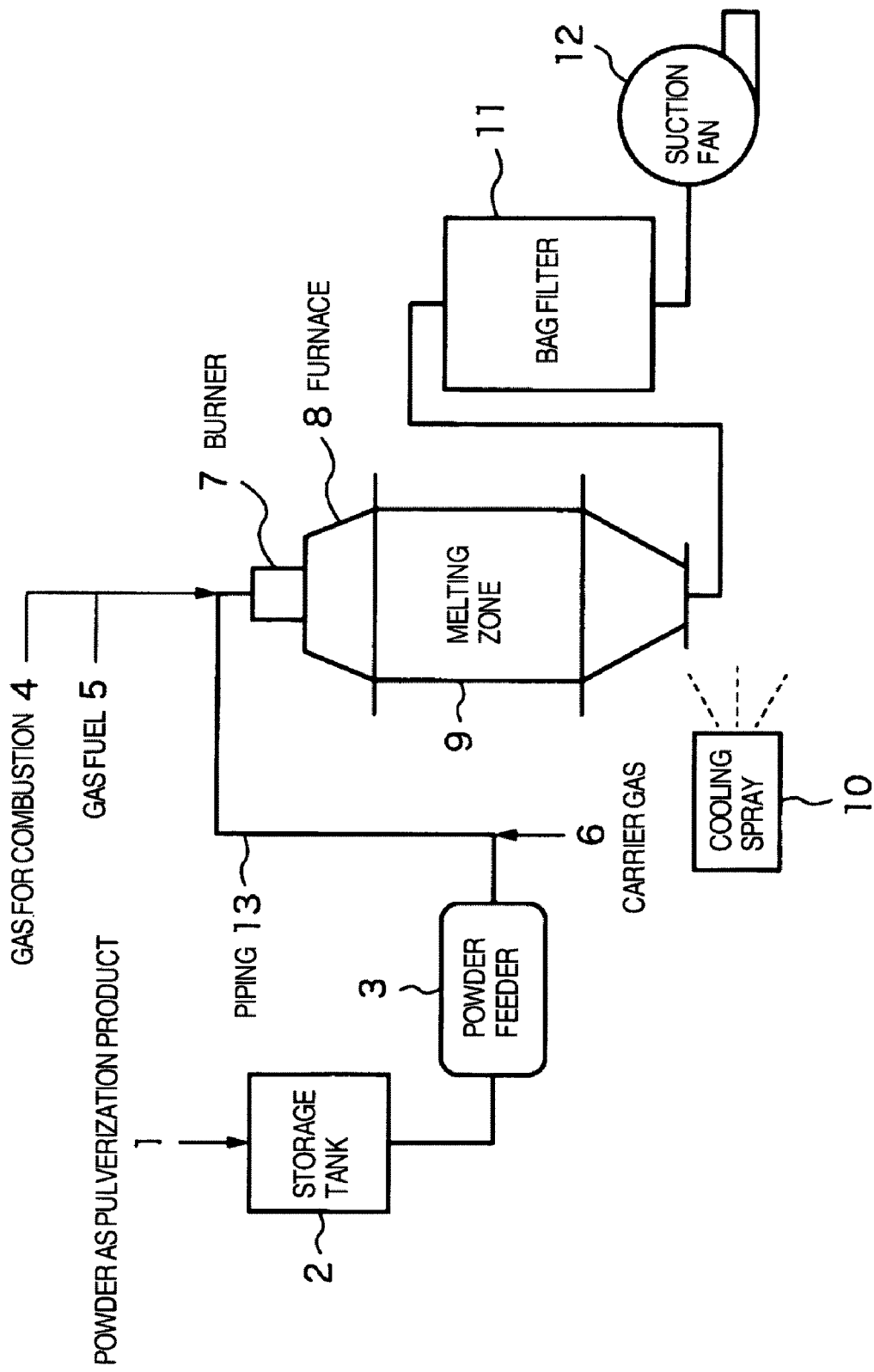
FIG. 1 outlines a system, i.e., test system with an air furnace, used for carrying out one embodiment of the process of the present invention.
Figure 2:
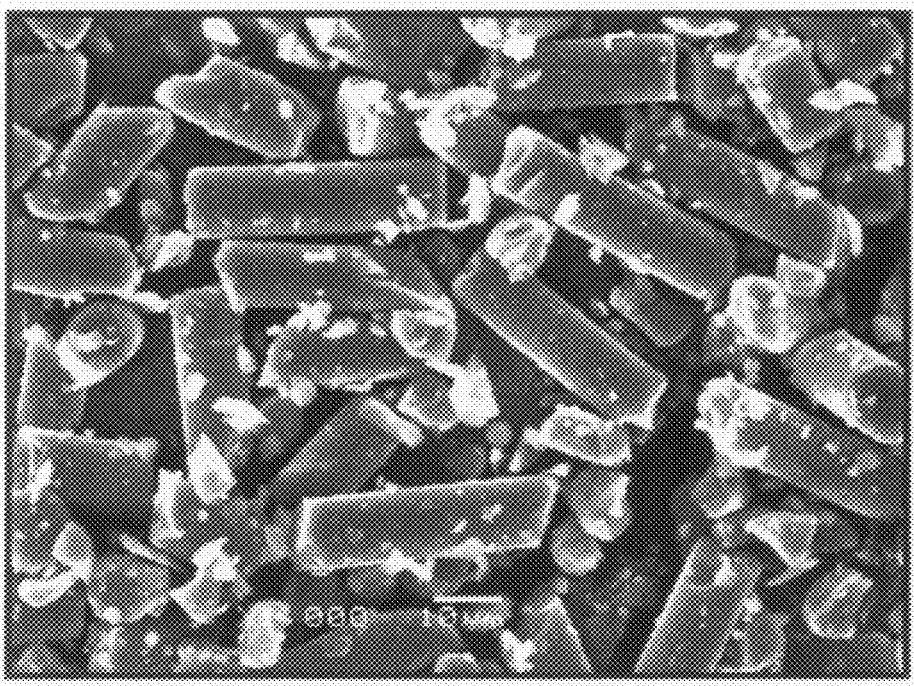
FIG. 2 shows the scanning electron micrograms of the spherical inorganic particles produced by one embodiment of the process of the present invention; (a) pulverization product of E-glass fibers, and (b) spherical E-glass particles.
Figure 2:
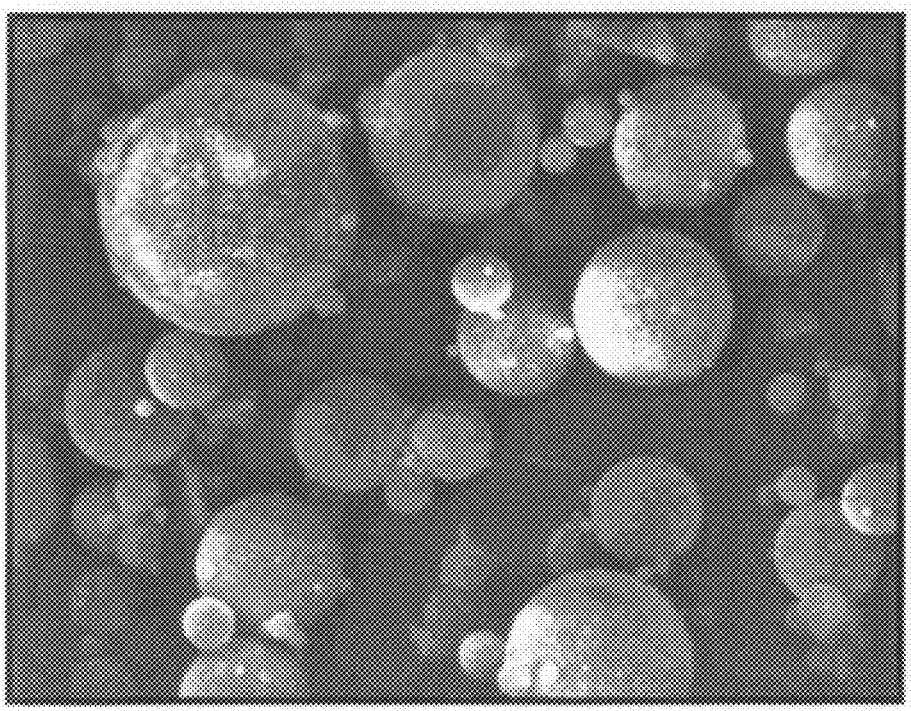
Figure 3:
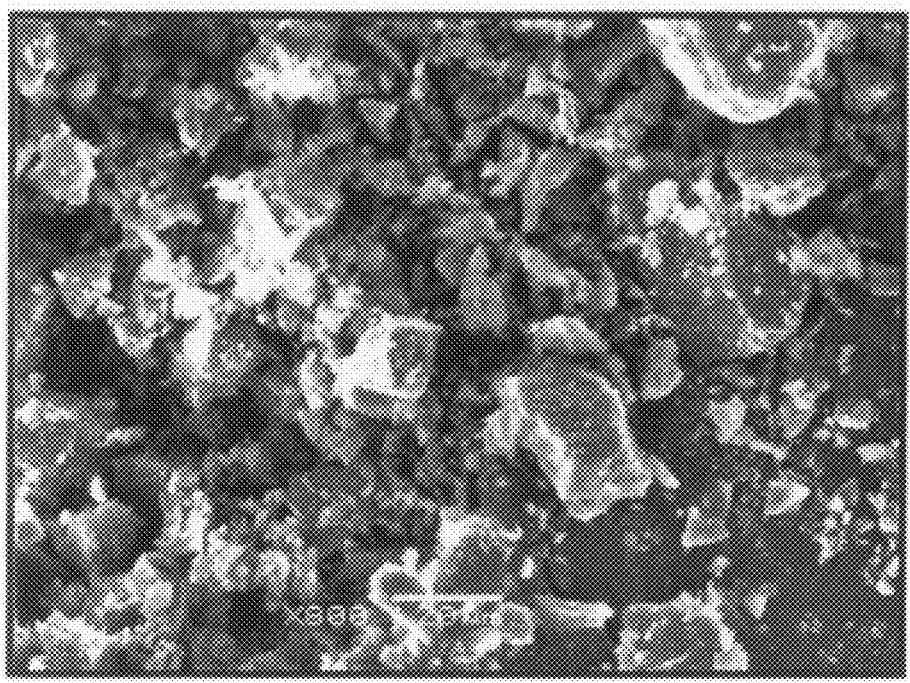
FIG. 3 shows the scanning electron micrograms of the spherical inorganic particles produced by the first aspect process of the present invention; (a) pulverization product of crystalline silica, and (b) spherical amorphous silica particles.
Figure 3:
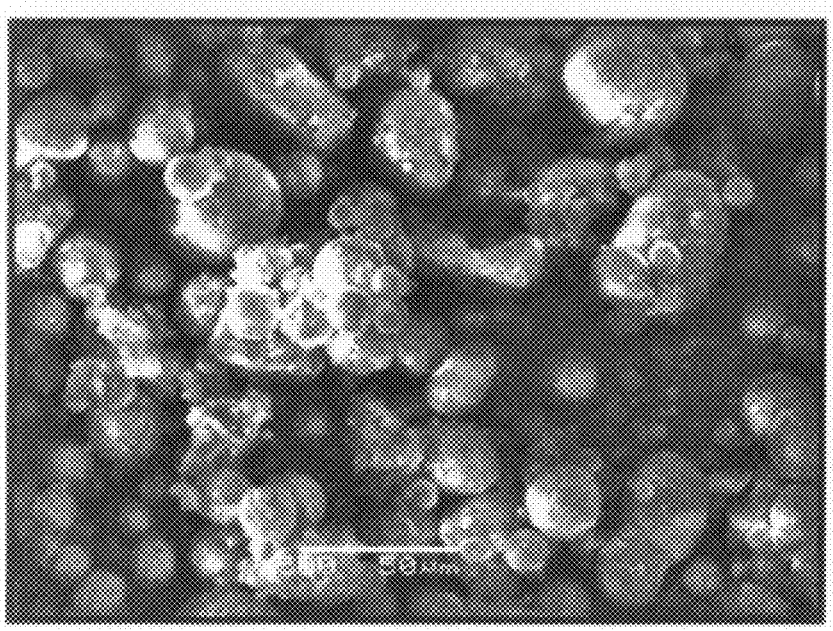

| | |
|---|---|
| 1 | Powder as pulverization product |
| 2 | Storage tank |
| 3 | Powder feeder |
| 4 | Gas for combustion |
| 5 | Fuel gas |
| 6 | Carrier gas |
| 7 | Burner |
| 8 | Furnace |
| 9 | Melting zone |
| 10 | Cooling spray |
| 11 | Bag filter |
| 12 | Suction fan |
| 13 | Piping |

The invention claimed is:

1. A process for producing spherical inorganic particles, comprising the following steps:
   (a1) pulverizing an inorganic material containing silicate to form a pulverization product;
   (b1) heating the pulverization product in a floated state to turn the pulverization product into spherical particles;
   (c1) spraying water containing an organosilane compound onto the spherical particles to cool the spherical particles while maintaining the floated state of the spherical particles, wherein the organosilane compound is a silane coupling agent; and
   (d1) collecting the cooled spherical particles.

2. The process according to claim 1, wherein the inorganic material containing silicate is vitreous.

3. The process according to claim 2, wherein the vitreous material is in the form of fibers.

4. The process according to claim 3, wherein the inorganic material containing silicate is not covered with a coating agent.

5. The process according to claim 1, wherein the silane coupling agent is represented by the following formula:

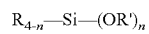

wherein, R is an organic group; R' is methyl, ethyl or propyl group; and n is an integer of 1 to 3.

6. A process for producing spherical glass particles, comprising the following steps:
   (a3) contacting a silicate-containing vitreous material containing an alkali metal oxide at 1.0% by mass or less with an acid to form silicate-containing vitreous material surface-treated with the acid,
   (b3) pulverizing the surface-treated silicate-containing vitreous material to form a pulverization product; and (c3) heating the pulverization product in a floated state to turn the pulverization product into the spherical particles; and then (d3) spraying water containing an organosilane compound onto the spherical particles to cool the spherical particles while maintaining the floated state of the spherical particles, wherein the organosilane compound is a silane coupling agent.

7. The process for producing spherical glass particles according to claim 6, wherein the silicate-containing vitreous material is in the form of glass fibers.

8. A process for producing spherical glass particles, comprising the following steps:
(a4) pulverizing a silicate-containing vitreous material containing an alkali metal oxide at 1.0% by mass or less to form a pulverization product;
(b4) contacting the pulverization product with an acid to form pulverization product surface-treated with the acid, and (c4) heating the surface-treated pulverization product in a floated state to turn the surface-treated pulverization product into spherical particles; and then (d4) spraying water containing an organosilane compound onto the spherical particles to cool the spherical particles while maintaining the floated state of the spherical particles, wherein the organosilane compound is a silane coupling agent.

9. The process for producing spherical glass particles according to claim 8, wherein the silicate-containing vitreous material is in the form of glass fibers.

10. The process according to claim 1, wherein the inorganic material containing silicate is not covered with a coating agent.

11. The process according to claim 2, wherein the inorganic material containing silicate is not covered with a coating agent.

* * * * *